(12) United States Patent
Tanaka et al.

(10) Patent No.: US 7,560,168 B2
(45) Date of Patent: Jul. 14, 2009

(54) GAS BARRIER LAMINATE FILM

(75) Inventors: Tsukasa Tanaka, Kasukabe (JP); Noboru Sasaki, Fukuoka (JP)

(73) Assignee: Toppan Printing Co., Ltd., Tokyo (JP)

( * ) Notice: Subject to any disclaimer, the term of this patent is extended or adjusted under 35 U.S.C. 154(b) by 544 days.

(21) Appl. No.: 11/132,299

(22) Filed: May 19, 2005

(65) Prior Publication Data

US 2005/0214530 A1 Sep. 29, 2005

Related U.S. Application Data

(63) Continuation of application No. PCT/JP03/14935, filed on Nov. 21, 2003.

(30) Foreign Application Priority Data

Nov. 22, 2002 (JP) ............................. 2002-339115

(51) Int. Cl.
    *B32B 27/32* (2006.01)
(52) U.S. Cl. .................. 428/500; 428/447; 428/448; 428/515; 428/701; 525/100; 525/102
(58) Field of Classification Search .................. None
    See application file for complete search history.

(56) References Cited

U.S. PATENT DOCUMENTS

| 5,942,320 | A * | 8/1999 | Miyake et al. ............ 428/216 |
| 2001/0031811 | A1 | 10/2001 | Li et al. |
| 2003/0187113 | A1* | 10/2003 | Shiho et al. .............. 524/261 |
| 2003/0194517 | A1* | 10/2003 | Shi et al. ................. 428/35.7 |
| 2004/0253463 | A1* | 12/2004 | Inui et al. ................. 428/448 |

FOREIGN PATENT DOCUMENTS

| EP | 0 646 611 A1 | 4/1995 |
| EP | 0 806 450 A2 | 11/1997 |
| JP | 4-345841 | 12/1992 |
| JP | 2556940 | 12/1992 |
| JP | 2790054 | 6/1995 |
| JP | 9-111016 | 4/1997 |
| JP | 9-156020 | 6/1997 |
| JP | 2880654 | 1/2000 |
| JP | 2000-052475 | 2/2000 |
| JP | 2000-127300 | 5/2000 |
| JP | 2001-138445 | 5/2001 |

OTHER PUBLICATIONS

Catalogue of Dow Corning Toray Co., Ltd.-Toray Dow Corning Silicone (see Office Action).
Japanese Office Action dated May 29, 2007; and English Translation.
Colombian Office Action dated Jan. 25, 2008, with English translation.
Japanese Office Action dated May 20, 2008 with English translation.

* cited by examiner

*Primary Examiner*—Marc S Zimmer
(74) *Attorney, Agent, or Firm*—Kratz, Quintos & Hanson, LLP

(57) ABSTRACT

A gas barrier laminate film comprising a resin substrate on which a gas barrier vapor deposition layer, and a gas barrier covering layer are laminated, wherein the gas barrier covering layer is formed through the coating, and drying of a coating liquid comprising $Si(OR^1)_4$ or the hydrolyzates thereof, $(R^2Si(OR^3)_3)_n$ or the hydrolyzates thereof (wherein $R^1$ and $R^3$ are individually $CH_3$, $C_2H_5$ or $C_2H_4OCH_3$, and $R^2$ is an organic functional group) and a water-soluble polymer having a hydroxyl group.

10 Claims, 1 Drawing Sheet

F I G. 1

F I G. 2

F I G. 3

F I G. 4

GAS BARRIER LAMINATE FILM

CROSS REFERENCE TO RELATED APPLICATIONS

This is a Continuation Application of PCT Application No. PCT/JP03/14935, filed Nov. 21, 2003, which was published under PCT Article 21 (2) in Japanese.

This application is based upon and claims the benefit of priority from prior Japanese Patent Application No. 2002-339115, filed Nov. 22, 2002, the entire contents of which are incorporated herein by reference.

BACKGROUND OF THE INVENTION

1. Field of the Invention

The present invention relates to a gas barrier laminate film which is useful as a material for a package to be employed in the fields of foodstuffs and such non-foodstuffs as medicine and electronic articles, and in particular, to a gas barrier laminate film which is excellent in gas barrier properties so that it is capable of preventing oxygen or water vapor in an air atmosphere from entering into the package, thereby making it possible to inhibit the deterioration or denaturing of the contents of the package.

2. Description of the Related Art

In order to inhibit the denaturing of the contents of the package and hence to retain the functions and properties of the contents, a packaging material to be employed for packaging foodstuffs and such non-foodstuffs as medicine and electronic articles is required to be such that it is capable of preventing the influence of gas such as oxygen, water vapor and other kinds of gases which permeate through the packaging material and cause the denaturing of the contents of the package. Thus, the packaging material is required to have a sufficient degree of gas barrier properties to block the permeation of these gases.

For this reason, there have been conventionally mainly employed, as a gas barrier layer, a resinous film made of a polyvinyl alcohol/ethylene vinyl copolymer, polyvinylidene chloride, polyacrylonitrile, etc.; a coated plastic film having a resin coating; or a metal foil made of aluminum for instance or a metallized film formed of aluminum for instance.

As for specific examples of the resinous film, JP Patent No. 2556940 for example discloses a laminate film comprising a resin substrate and a covering layer which is obtained through the polycondensation, by means of sol-gel method, of a composition comprising alkoxy silane such as $Si(O-CH_3)_4$, silane coupling agent such as epoxy silane, and polyvinyl alcohol. Since this covering layer is formed through hydrogen bond, this covering layer can be easily swelled and dissolved as it is exposed to water. Therefore, under severe conditions such as boiling or retort-treatment, the gas barrier properties of this covering layer can easily deteriorat.

On the other hand, in the case of the metal foil and the metallized film, although they are excellent in gas barrier properties, they are accompanied with problems that it is impossible to visually recognize the contents of the package through a packaging material, that it is impossible to use a metal detector on the occasion of examination of the contents of the package, and that they are required to be disposed as a noncombustible substance on the occasion of disposal. Further, in the case of the gas barrier resin film and the film having a gas barrier resin coating, they are largely dependent on temperature and humidity so that they are incapable of retaining sufficient gas barrier properties. Furthermore, in the case of vinylidene chloride and polyacrylonitrile which have been employed as a gas barrier resin, they may become a source of harmful substance on the occasion of disposal or incineration.

Because of the aforementioned problems, there is proposed, in JP Patent No. 2790054 for example, a gas barrier packaging material which is formed of a laminate comprising a first layer composed of a vapor deposition layer of an inorganic compound; and a second layer constituted by a gas barrier covering layer which can be obtained from a process wherein a coating agent comprising, as major components, (1) a water-soluble polymer, and (2) I) at least one kind of metal alkoxide or metal alkoxide hydrolyzate, or II) an aqueous solution or water/alcohol mixed solution containing tin chloride is coated and thermally dried to obtain the gas barrier covering layer. This gas barrier packaging material is excellent in gas barrier properties, in water resistance and in humidity resistance, and is more or less heat resisant. However, since the second layer of the gas barrier packaging material is formed of a hydrogen bond between the metal alkoxide hydrolyzate and the water-soluble polymer having hydroxyl group, when the gas barrier packaging material is employed as a packaging material which is designed to be subjected to boiling treatment or retort sterilization treatment, the covering layer is caused to swell, raising the problem of deterioration of gas barrier properties. Even if the degree of deterioration of gas barrier properties is small, this kind of packaging material is not suited for use as a packaging material which is required to have very high gas barrier properties as in the case of the primary package for a transfusion liquid for instance.

BRIEF SUMMARY OF THE INVENTION

The present invention is provided for solving the aforementioned problems of the prior art, and therefore, one of the objects of the present invention is to provide a film which is excellent in transparency enabling contents in a package to be visually recognized, is capable of withstanding the application of a metal detector, is excellent in gas barrier properties under high temperatures and high humidities, can be used as a packaging material for boiling or retort treatment, and is capable of exhibiting optimal gas barrier properties as a packaging material without requiring the employment of a substance which is harmful to the environment.

A gas barrier laminate film of the invention comprises a resin substrate; a gas barrier vapor deposition layer formed on the resin substrate and mainly containing an inorganic compound; and a gas barrier covering layer formed on the gas barrier vapor deposition layer; wherein the gas barrier covering layer is formed through the coating, heating and drying of a coating liquid which comprises: one of materials selected from a silicon compound represented by a general formula of $Si(OR^1)_4 \ldots$ (1) and the hydrolyzates thereof; one of materials selected from a silicon compound represented by a general formula of $(R^2Si(OR^3)_3)_n \ldots$ (2) and the hydrolyzates thereof (wherein $R^1$ and $R^3$ are individually $CH_3$, $C_2H_5$ or $C_2H_4OCH_3$; and $R^2$ is an organic functional group); and a water-soluble polymer having hydroxyl group.

DETAILED DESCRIPTION OF THE INVENTION

A gas barrier laminate film according to the present invention comprises a resin substrate having a pair of major surfaces, at least one of the major surfaces is deposited with a laminate comprising a gas barrier vapor deposition layer containing an inorganic compound, and a gas barrier covering layer, wherein the gas barrier covering layer is formed through the coating, heating and drying of a coating liquid comprising:

i) at least one of materials selected from a silicon compound represented by a general formula of $Si(OR^1)_4$ ... (1) and the hydrolyzates thereof;

ii) at least one of materials selected from a silicon compound represented by a general formula of $(R^2Si(OR^3)_3)_n$ ... (2) and the hydrolyzates thereof (wherein $R^1$ and $R^3$ are individually $CH_3$, $C_2H_5$ or $C_2H_4OCH_3$; and $R^2$ is an organic functional group); and iii) a water-soluble polymer having a hydroxyl group.

According to the present invention, since the gas barrier covering layer is composed of these three kinds of components, it can be sufficiently insolubilized. Since the ($R^2Si(OR^3)_3$) of general formula (2) is capable, through the hydrolysis thereof, of forming a hydrogen bond with $Si(OR^1)_4$ of general formula (1) and also with the water-soluble polymer, it is possible to inhibit the generation of pores in the barrier layer. On the other hand, since the organic functional group is capable of creating a network, it is possible to prevent the swelling of the water-soluble polymer that may be generated due to the addition of water to the hydrogen bond, thereby making it possible to greatly enhance the water resistance of the film.

It shall be noted that "pores in the barrier layer" means portions where gas can easily pass through without forming a dense network in the film.

Further, since the gas barrier covering layer is formed on a substrate in combination with the gas barrier vapor deposition layer, it is possible to realize excellent gas barrier properties. Moreover, according to the present invention, even if an adhesive coating layer or so-called primer layer or a specially treated layer is not interposed between the substrate and the inorganic vapor deposition layer, it is possible to prevent deterioration in terms of oxygen permeability and laminate strength even after the boiling sterilization treatment or retort sterilization treatment. Additionally, it is possible, according to the present invention, to provide a laminate film which is capable of substantially preventing the peeling of the vapor deposition layer from the substrate, which can be manufactured at low cost, and which is excellent in practicability.

Figure 1:
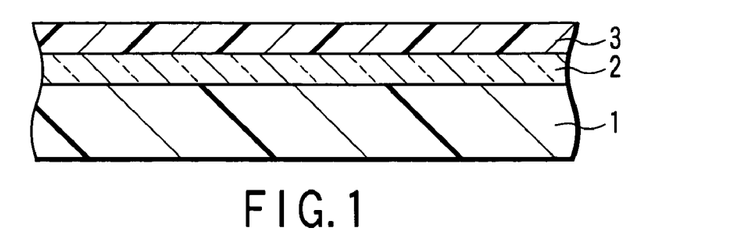
FIG. 1 is a cross-sectional view illustrating one example of a gas barrier laminate film according to the present invention.

FIG. 1 shows a cross-sectional view illustrating one example of a gas barrier laminate film of the present invention.

As shown in FIG. 1, this gas barrier laminate film is constructed such that it comprises a resin substrate, on which a transparent gas barrier vapor deposition layer 2 to be obtained from the deposition of aluminum oxide for instance and a gas barrier covering layer 3 are laminated, the gas barrier covering layer 3 being obtained through the coating and drying of a coating liquid comprising the aforementioned three components, i.e. i), ii) and iii).

Since the gas barrier vapor deposition layer 2 and the gas barrier covering layer 3 are laminated one upon another on the substrate 1, it is possible to realize excellent gas barrier properties.

Figure 2:
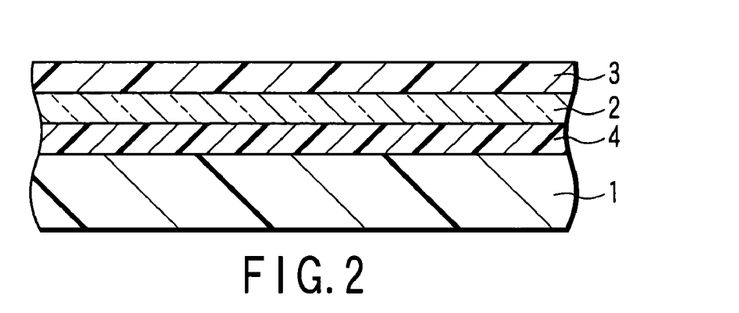
FIG. 2 is a cross-sectional view illustrating another example of a gas barrier laminate film according to the present invention.

Further, FIG. 2 shows a cross-sectional view illustrating one example of a gas barrier laminate film of the present invention. As shown in FIG. 2, this laminate film is formed with the same structure as that of the laminate film shown in FIG. 1 except that a primer layer 4 comprising, for example, acrylic polyol, isocyanate and a silane coupling agent is interposed between the resin substrate 1 and the gas barrier vapor deposition layer 2.

It is possible, through the provision of this primer layer 4, to obtain a stable and high adhesion between the resin substrate 1 and the gas barrier vapor deposition layer 2.

Further, in the laminate film shown in FIGS. 1 and 2, a heat seal layer may be laminated on the surface of the gas barrier covering layer 3, thereby making it possible to obtain a laminate film having practical and excellent properties as a packaging material.

$R^1$ in the general formula (1) may be optionally selected from those represented by $CH_3$, $C_2H_5$ and $C_2H_4OCH_3$. Among them, it is more preferable to employ those which are relatively stable in an aqueous solvent after the hydrolysis of tetraethoxy silane.

Metal alkoxide is permitted to condense subsequent to the hydrolysis thereof, thereby forming a ceramic film. However, since metal oxide is hard and vulnerable to the generation of cracking due to the stress caused by volumetric contraction on the occasion of condensation, it would be very difficult to form a thin, transparent and uniform condensed film. Whereas, it is possible, through incorporation of a polymer, to form a film of flexible structure while preventing the generation of cracks. However, even if it is possible, through the incorporation of a polymer, to form a uniform film as viewed visually, there will be often recognized microscopically the separation of silicon or metal oxide from the polymer portions, thus leading to the deterioration of gas barrier properties.

It is possible, through the addition of a polymer to metal alkoxide, to form a film of flexible structure while preventing the generation of cracks. However, even if it is possible, through the incorporation of a polymer, to form a uniform film when it is viewed visually, there will be often recognized, when it is viewed microscopically, the separation of metal oxide from the polymer portions, thus often giving rise to the generation of pores in the barrier layer when the film is employed as a gas barrier packaging material. Therefore, it is proposed to incorporate a polymer having hydroxyl group so as to make it possible to utilize a strong hydrogen bond between the hydroxyl group of the polymer and the hydroxyl group of the hydrolyzate of metal alkoxide in sufficiently dispersing the metal oxide among the polymer at the time of the condensation of the metal oxide, thus making it possible to realize a high degree of gas barrier properties which is close to that of ceramics. Further, when this film is superimposed on a vapor deposition layer of an inorganic compound, it is possible to obtain a laminate exhibiting much higher gas barrier properties, water resistance and humidity resistance as compared with those to be derived from a monolayer consisting one of these layers. However, since a gas barrier covering layer comprising a mixture of metal alkoxide or the hydrolyzate thereof and a water-soluble polymer having hydroxyl group is formed through hydrogen bond, it can easily swell and be dissolved as it is exposed to water. Even if it is possible to expect synergistic effects from the laminate structure of this covering layer with a vapor deposition layer, the gas barrier properties would be easily deteriorated under severe conditions such as boiling or retort treatment.

Whereas, according to the present invention, it is possible to prevent the aforementioned swelling through the employment of a compound represented by the aforementioned general formula (2).

In the general formula (2), the organic functional group (R²) should preferably be constituted by a nonaqueous functional group such as vinyl, epoxy, methacryloxy, ureido, isocyanate, etc. Since the functional group of this nonaqueous functional group is hydrophobic, the water resistance can be further enhanced.

When the compound represented by the general formula (2) is a polymer, it should preferably be a trimer. More preferably, it should be 1,3,5-tris(3-trialkoxysilylalkyl)isocyanurate which can be represented by the general formula: (NCO—R⁴Si(OR³)₃)₃ (wherein R⁴ is (CH₂)ₙ, n is 1 or more). This compound is a condensation product of 3-isocyanate alkylalkoxy silane.

Although the isocyanurate moiety of this 1,3,5-tris(3-trialkoxysilylalkyl)isocyanurate is not chemically reactive, the isocyanurate moiety is known to exhibit a performance which is similar to reaction on account of the polarity of the nurate moiety. Generally, it is known that this 1,3,5-tris(3-trialkoxysilylalkyl)isocyanurate is incorporated, as an adhesion improver, in an adhesive in the same manner as in the case of 3-isocyanate alkylalkoxysilane. Therefore, when this 1,3,5-tris(3-trialkoxysilylalkyl)isocyanurate is incorporated in a water-soluble polymer having Si(OR¹)₄ and hydroxyl group, it is possible to prevent a gas barrier laminate film from being swelled by water due to hydrogen bond, thus making it possible to enhance the water resistance of the layer. While 3-isocyanate alkylalkoxysilane is highly reactive and low in liquid stability, the nurate moiety can be easily dispersed in an aqueous liquid even though the nurate moiety is not water-soluble due to the polarity thereof, thereby making it possible to stably retain the liquid viscosity. Further, the water resistance of this 1,3,5-tris(3-trialkoxysilylalkyl)isocyanurate is almost the same as that of 3-isocyanate alkylalkoxysilane. Further, the nurate moiety is not only water-resistive but also useful, due to the polarity thereof, in inhibiting the water-soluble polymer having Si(OR¹)₄ and hydroxyl group from forming pores in the barrier layer.

This 1,3,5-tris(3-trialkoxysilylalkyl)isocyanurate can be manufactured through the thermal condensation of 3-isocyanate propylalkoxysilane, so that it may include 3-isocyanate alkylalkoxysilane employed as a raw material. The inclusion of this raw material however will not raise any problem. A more preferable example of the 1,3,5-tris(3-trialkoxysilylalkyl)isocyanurate is 1,3,5-tris(3-trialkoxysilylpropyl)isocyanurate and a most preferable example of the 1,3,5-tris(3-trialkoxysilylalkyl)isocyanurate is 1,3,5-tris(3-trimethoxysilylpropyl)isocyanurate having the following structural formula (3).

structural formula (3)

This methoxy group is high in speed of hydrolysis and those containing propyl group are available at relatively low cost, and, therefore, the compound having the aforementioned structural formula (3) is advantageous from a practical viewpoint.

Further, as for the organic functional group R² of the general formula (2), it is possible to preferably employ 3-glycidoxypropyl group or 2-(3,4-epoxycyclohexyl) group. Since these organic functional groups are capable, through hydrolysis, of forming hydrogen bond with the Si(OR¹)₄ of the general formula (1) and with a water-soluble polymer, it is possible to inhibit the generation of pores in the barrier layer and to enhance the water resistance without badly affecting the gas barrier properties of the gas barrier layer.

However, some of the aforementioned epoxy-based silane compounds may be a mutagenic compound. Further, when the organic functional group (R²) is vinyl and methacryloxy, it may require the irradiation of ultraviolet rays or an electron beam, thus often leading to an increase in manufacturing cost due to the increase in scale of installation or in manufacturing steps. When the organic functional group (R²) is ureido, the problem of specific smelling is raised. Further, when the organic functional group (R²) is isocyanate, the reactivity will become so high that the pot life will be short. In view of these problems, it seems more preferable to employ 1,3,5-tris(3-trialkoxysilylalkyl)isocyanurate as the aforementioned component ii) of the present invention.

The substrate to be employed in the present invention is formed of a resinous material, more preferably a transparent resinous material. Specific examples of such resinous material include, for example, a film of polyester such as polyethylene terephthalate (PET), polyethylene naphthalate (PEN), etc.; a film of polyolefin such as polyethylene, polypropylene, etc.; a film of polystyrene; a film of polyamide such as 66-nylon, etc.; a film of polycarbonate; a film of polyacrylonitrile; and a film of engineering plastics such as a film of polyimide, etc. These resinous materials may be either an orientated material or an unorientated material and should preferably be selected from those which are excellent in mechanical strength and in dimensional stability. These resinous materials are worked into a film-like configuration before they are employed as a substrate. Especially, it is more preferable to employ these resinous materials as an oriented film which has been optionally biaxially stretched. Further, when these materials are to be employed as a packaging material, it would be more preferable to employ polyamide film and polyester film, most preferably polyester film when the cost, moisture resistance, filling properties, aesthetic property and disposability are taken into consideration.

With respect to the thickness of the substrate, although there is not any particular limitation, the thickness thereof should preferably be confined, in practical viewpoint, within the range of 3 to 200 µm, more preferably within the range of 6 to 30 µm when the suitability for use as a packaging material as well as the workability thereof are taken into consideration.

If necessary, various kinds of known additives or stabilizing agents such as an antistatic agent, a plasticizer, a lubricant and an antioxidant may be applied to the surface of the substrate.

For the purpose of improving the adhesion, the surface of the substrate may be subjected to pre-treatments such as corona treatment, a plasma treatment, an ozone treatment, etc. Further, the surface of the substrate may be subjected to a chemical treatment, a solvent treatment, etc. In particular, the plasma treatment is preferable for the purpose of enhancing the adhesion between the surface of the substrate and a vapor deposition layer of an inorganic compound to be superimposed thereon.

As for the inorganic compound to be employed for forming the vapor deposition layer, it is possible to employ, for example, the oxides, nitrides and fluorides of silicon, aluminum, titanium, zirconium, tin and magnesium as well as the composites of these oxides, nitrides and fluorides.

This vapor deposition layer can be formed by means of a vacuum process such as a vacuum deposition method, a sputtering method, a plasma vapor-phase growth method, etc. In particular, since aluminum oxide is colorless and transparent, is excellent in water resistance in boiling/retort treatments, and is suited for use in various kinds of applications, the employment of aluminum oxide is more preferable.

In this aluminum oxide, the abundance between aluminum (Al) and oxygen (O) should preferably be confined within the range of Al:O=1:1.5-1:2.0.

An aluminum oxide vapor deposition layer for example can be formed by means of reactive deposition, reactive sputtering or reactive ion plating where the formation of thin film is performed using aluminum as an evaporation source in the presence of a mixed gas comprising oxygen, carbon dioxide gas and an inert gas. On this occasion, when aluminum is to be reacted with oxygen, the ratio between aluminum and oxygen (Al:O) is expected to be 1:1.5 since the reaction product would be, stoichiometrically, $Al_2O_3$. However, depending on the kind of deposition method, aluminum may be partially permitted to exist as it is, or permitted to exist as aluminum peroxide. Thus, it will be recognized from the measurement of the abundance of elements in the vapor deposition layer by making use of an X-ray photoelectron spectroscopic analyzer (ESCA) that the abundance between aluminum and oxygen may not necessarily be Al:O=1:1.5. Generally speaking, when the ratio of oxygen is smaller and the ratio of aluminum is larger than Al:O=1:1.5, it is possible to obtain a film of high density and hence excellent in gas barrier properties. However, the resultant deposition film may be colored black, thus the quantity of permeation of light tends to become smaller. On the contrary, when the ratio of oxygen is larger and the ratio of aluminum is smaller than Al:O=1:1.5, a film of low density and hence poor in gas barrier properties but high in quantity of permeation of light as well as in transparency would be obtained.

Since the gas barrier laminate film according to the present invention, which is suited for boiling and retort sterilization treatments, is realized through a combination of the vapor deposition layer with the gas barrier covering layer 3 to be explained below, the abundance between aluminum and oxygen should preferably be Al:O=1:1.5-2.0.

Although the thickness of the vapor deposition layer may differ more or less depending on the thickness of the gas barrier covering layer, it should preferably be confined within the range of several tens of angstroms to 5000 angstroms. However, if the thickness of the vapor deposition layer is 50 angstroms or less, it will give rise to a problem of continuity of the resultant thin film. On the other hand, if the thickness of the vapor deposition layer exceeds over 3000 angstroms, cracks tend to be generated in the vapor deposition layer and the resultant vapor deposition layer would become low in flexibility. Therefore, the thickness of the vapor deposition layer should preferably be confined within the range of 50 to 3000 angstroms.

It is possible, through the provision of a primer layer between the substrate and the vapor deposition layer, to obtain a vapor deposition layer of an inorganic compound which is excellent in uniformity and in gas barrier properties. Further, the provision of this primer layer is preferable in order to constantly secure excellent adhesion without being influenced by the composition of the vapor deposition layer or by the abundance between aluminum and oxygen.

As for the material for the primer layer, it is possible to employ those which contain, as a major component, an organic polymer to be derived from a two-liquid reaction between polyols selected from the group consisting of acrylic polyol, polyvinyl acetal, polystil polyol, polyurethane polyol, etc. and an isocyanate compound; an urethane bond-containing organic compound to be derived from a reaction between a polyisocyanate compound and water; polyethylene imine or derivatives thereof; a polyolefin-based emulsion; polyimide, melamine; phenol; or inorganic silica such as organic modified colloidal silica; and an organic silane compound such as silane coupling agent or hydrolyzate thereof. Especially, it is preferable to employ a combination of compounds consisting of acrylic polyol, an isocyanate compound and a silane coupling agent. When a primer layer composed of this combination is employed, it is possible to realize stable and more excellent adhesion between the substrate and the vapor deposition layer.

Generally, the coating of the primer layer should preferably be performed such that the thickness of the primer layer after being dried is confined within the range of 0.005 to 5 μm, more preferably 0.01 to 1 μm. If the thickness of the primer layer is less than 0.01 μm, it may become difficult to obtain a uniform film in view of the current coating technique. On the other hand, even if the thickness of the primer layer is increased to exceed over 1 μm, it would be uneconomical.

If $Si(OR^1)_4$ is calculated as $SiO_2$ and if $R^2Si(OR^3)_3$ is calculated as $R^2Si(OH)_3$, the solid matter of $R^2Si(OH)_3$ should preferably be confined within the range of 1-50 wt % based on the total weight of solid matters. If the solid matter of $R^2Si(OR^3)_3$ is confined within the aforementioned range, it is possible to obtain a gas barrier covering layer which is excellent in water resistance which will not deteriorate even if the gas barrier covering layer is subjected to a severe treatment such as boiling and retort sterilizing treatments. If the ratio of the solid matter of $R^2Si(OR^3)_3$ is less than 1 wt %, the gas barrier covering layer tends to become poor in water resistance. If the ratio of the solid matter of $R^2Si(OR^3)_3$ exceeds 50 wt %, the functional group would be turned into pores in the gas barrier covering layer, thereby possibly degrading the gas barrier properties of the gas barrier covering layer. In order to secure a sufficient water resistance to withstand boiling and retort sterilizing treatments and to further improve the gas barrier properties of the gas barrier covering layer, the solid matter of $R^2Si(OR^3)_3$ should be confined within the range of 5-30 wt % based on the total weight of solid matters.

When $Si(OR^1)_4$ is calculated as $SiO_2$ and $R^2Si(OR^3)_3$ is calculated as $R^2Si(OH)_3$, as long as the mixing ratio, based on weight, of solid matters, i.e. $SiO_2/(R^2Si(OH)_3$/water-soluble polymer), is confined within the range of 100/100 to 100/30, it is possible to provide the gas barrier covering layer with a sufficient water resistance to withstand boiling and retort sterilizing treatments and with excellent gas barrier properties, and, at the same time, it is possible to preferably provide the gas barrier covering layer with a sufficiently high flexibility as it is employed as a packaging material.

As for the water-soluble polymer having hydroxyl group to be included in the gas barrier covering layer of the present invention, it would be preferable to employ polyvinyl alcohol, starch and cellulose. Especially, when polyvinyl alcohol (hereinafter referred to as PVA) is employed in a coating agent of the present invention, it would be possible to realize most preferable gas barrier properties. Because, since PVA is a polymer containing a largest number of hydroxyl groups in the monomer unit, it is capable of providing very strong hydrogen bond with the hydroxyl group of metal alkoxide which has been hydrolyzed. Herein, PVA is intended to mean those that can be obtained generally through the saponification of polyvinyl acetate, so that the scope of PVA includes not only so-called partially saponified PVA where several tens of % of acetate group is left remained but also completely saponified PVA where only several % of acetate group is left remained. With respect to the molecular weight of PVA, although there are known various degree of polymerization ranging from 300 to several thousands, it is possible to employ any of them. However, it is generally preferable to employ PVA of high molecular weight which is relatively high in saponification and in degree of polymerization, because such a PVA is excellent in water resistance.

With respect to the method of hydrolyzing $Si(OR^1)_4$, it can be performed using an acidic or basic catalyst, alcohol and water as generally known. However, the hydrolysis by making use of an acid is more preferable, since it can be easily controlled. In this case, in order to further control the hydrolysis, it is possible to additionally employ catalysts which are generally known, such as tin chloride, acetyl acetonate, etc.

With respect to the mixing manner of the coating solution, the hydrolyzed $Si(OR^1)_4$, the water-soluble polymer having hydroxyl group, and $R^2Si(OR^3)_3$ can be mixed in any order without deteriorating the effects of the present invention. If $R^2Si(OR^3)_3$ is not dispersed in the coating solution even after the mixing thereof and permitted to exist in the form of oily particle, the $R^2Si(OR^3)_3$ should preferably be subjected to hydrolysis, thereby enabling the $R^2Si(OR^3)_3$ to finely disperse in the coating solution. It is preferable, in view of realizing fine dispersion of $SiO_2$ and enhancing the hydrolyzing efficiency of $Si(OR^1)_4$, to separately hydrolyze the $Si(OR^1)_4$ and the $R^2Si(OR^3)_3$ before they are incorporated into the water-soluble polymer.

As long as the gas barrier properties and water resistance of the coating solution is not hindered, various kinds of additives such as an isocyanate compound, colloidal silica, clay mineral such as smectite, a stabilizer, a coloring agent, a viscosity modifier, etc., may be incorporated into the coating solution for forming the gas barrier covering layer while taking into consideration the adhesion of the gas barrier covering layer to ink and adhesive agent, the wettability, and the prevention of cracking due to shrinkage.

Although there is not any particular limitation with respect to the thickness of the gas barrier covering layer after the drying thereof, the thickness of the gas barrier covering layer should preferably be confined within the range of 0.01 to 50 µm since if the thickness is increased exceeding over 50 µm, there would be much possibility of generating the cracks thereof.

As for the method of forming the gas barrier covering layer 3, it is possible to employ ordinary coating methods. For example, it is possible to employ a dipping method, roll coating, gravure coating, reverse coating, air knife coating, comma coating, die coating, a screen printing method, spray coating, gravure offset method, etc. By making use of any of these methods, the gas barrier covering layer 3 can be formed on the vapor deposition layer.

As for the method of drying the gas barrier covering layer, it is possible to employ any kind of method which is capable of applying heat to the gas barrier covering layer to remove water molecule such as hot air drying, hot roll drying, high-frequency irradiation, infrared irradiation, UV irradiation, etc., these methods may be used in any combination of two or more.

When a heat seal layer is formed on the gas barrier covering layer of the present invention, it is possible to provide a packaging material which is highly practical. The heat seal layer is usually utilized at the adhesion portion on the occasion of forming a pouch-like package and can be formed using, for example, polyethylene, polypropylene, ethylene-vinyl acetate copolymer, ethylene-methacrylic acid copolymer, ethylene-methacrylate copolymer, ethylene-acrylic acid copolymer, ethylene-acrylate copolymer, and a metal-crosslinked substance of these resins. Although the thickness of the heat seal layer may be optionally selected according to the object desired, it may generally range from 15 to 200 µm. Further, depending on the configuration of the package, the heat seal layer may be provided on the substrate side.

As for the method of forming the heat seal layer, it is possible to employ known laminating methods such as a dry laminate method wherein a film-like material consisting of any one of the aforementioned resins is bonded together by making use of a two-liquid curing type urethane adhesive non-solvent dry laminate method wherein a non-solvent adhesive is utilized, an extrusion laminate method wherein any one of the aforementioned resins is thermally melted and extruded in a form of sheet which is then bonded together, etc.

A relaxation layer consisting of oriented nylon, oriented polyester, oriented polypropylene, etc. can be interposed between the heat seal layer and the gas barrier covering layer. It is possible, through the provision of this relaxation layer, to further enhance the pin-hole resistance, shock resistance and heat resistance of the laminate film.

If required, a printing layer may be laminated on the gas barrier covering layer. Alternatively, plural kinds of resins may be laminated through adhesives. Further, these printing layer, heat seal layer, plural kinds of resins accompanying an adhesive may be applied also to the reverse surface of substrate which is opposite to the gas barrier covering layer.

Next, the gas barrier laminate of the present invention will be further explained with reference to specific examples.

EXAMPLES 1-8

A biaxially oriented PET (P60; Toray Co., Ltd.) having a thickness of 12 µm and a corona-treat surface was employed as a substrate and aluminum was thermally deposited on the corona-treat surface by means of electron beam heating system using an aluminum evaporation source. In this case, the evaporation of aluminum was adjusted while introducing oxygen gas so as to obtain a prescribed film composition, thereby forming an aluminum oxide vapor deposition layer having a thickness of 150 angstroms.

The film composition of the aluminum oxide vapor deposition layer comprising aluminum and oxygen was measured by making use of an X-ray photoelectron spectroscopic analyzer (ESCA) (JPS-90SXV; Nippon Denshi Co., Ltd.) and according to Depth Profiling method using argon etching, thereby adjusting and obtaining the film composition as follows.

| | |
|---|---|
| Examples 1-5, 8, Comparative Example; | Al:O = 1:1.8 |
| Example 6; | Al:O = 1:1.0 |
| Example 7; | Al:O = 1:2.2 |

Coating solutions (A)-(E) which were adjusted according to the following method were mixed at the following ratios to prepare coating solutions. Then, by making use of a bar coater, these coating solutions were respectively coated on the upper surface of one of the aforementioned aluminum oxide vapor deposition layers and dried for one minute at a temperature of 120° C. by means of drying apparatus to form a gas barrier covering layer having a thickness of about 0.3 μm, thereby obtaining a gas barrier laminate film having the same construction as shown in FIG. 1.

Solutions for gas barrier covering layer:

(A): A hydrolyzed solution containing 5% (weight ratio, calculated as $SiO_2$) of solid matters, which was obtained from a process wherein 17.9 g of tetraethoxy silane ($Si(OC_2H_5)_4$, hereinafter referred to as TEOS), 10 g of methanol and 72.1 g of hydrochloric acid (0.1 N) were mixed together and stirred for 30 minutes to perform hydrolysis.

(B): 5% (weight ratio) of polyvinyl alcohol, and an aqueous solution of water/methyl alcohol=95/5 (weight ratio).

(C): A hydrolyzed solution containing 5% (weight ratio, calculated as $R^2Si(OH)_3$) of solid matters, which was obtained from a process wherein hydrochloric acid (0.1N) was gradually added to β-(3,4-epoxycyclohexyl)trimethoxy silane and isopropyl alcohol (IPA solution) and stirred for 30 minutes to perform hydrolysis, after which the hydrolysis using a water/IPA=1/1 solution was performed.

(D): A hydrolyzed solution containing 5% (weight ratio, calculated as $R^2Si(OH)_3$) of solid matters, which was obtained from a process wherein hydrochloric acid (0.1 N) was gradually added to γ-glycidoxypropyltrimethoxy silane and IPA solution and stirred for 30 minutes to perform hydrolysis, after which the hydrolysis using a water/IPA=1/1 solution was performed.

(E): A solution containing 5% (weight ratio, calculated as $R^2Si(OH)_3$) of solid matters, which was obtained by diluting 1,3,5-tris(3-methoxysilylpropyl)isocyanurate with a water/IPA=1/1 solution.

(F): A hydrolyzed solution containing 5% (weight ratio, calculated as $R^2Si(OH)_3$) of solid matters, which was obtained from a process wherein hydrochloric acid (0.1 N) was gradually added to vinyltrimethoxy silane and IPA solution and stirred for 30 minutes to perform hydrolysis, after which the hydrolysis using a water/IPA=1/1 solution was performed.

The mixing ratio of components in a coating solution for the gas barrier covering layer:

A: $SiO_2$ solid matter of TEOS (reduced value)
B: PVA solid matter
C: $R^2Si(OH)_3$ solid matter (reduced value) of β-(3,4-epoxycyclohexyl)trimethoxy silane
D: $R^2Si(OH)_3$ solid matter (reduced value) of γ-glycidoxypropyltrimethoxy silane
E: $R^2Si(OH)_3$ solid matter (reduced value) of 1,3,5-tris(3-methoxysilylpropyl)isocyanurate
F: $R^2Si(OH)_3$) solid matter (reduced value) of vinyltrimethoxy silane The mixing ratio is all based on weight ratio of solid matter.
Examples 1, 6 and 7 - - - A/B/C=70/20/10
Example 2 - - - A/B/D=70/20/10
Example 3 - - - A/B/F=70/20/10
Example 4 - - - A/B/C=20/20/60
Example 5 - - - A/B/C=90/5/5
Example 8 - - - A/B/E=100/20/10
Comparative Example 1 - - - A/B/C=70/30/0

By making use of a laminator and a polyurethane-based adhesive (A515/A50; Takeda Yakuhin Industries Co., Ltd.), an oriented nylon having a thickness of 15 μm (ONMB-RT; Yunichika Co., Ltd.) was laminated on the gas barrier covering layer of the gas barrier laminate film thus obtained. Then, by making use of a polyurethane-based adhesive (A515/A50; Takeda Yakuhin Industries Co., Ltd.), unoriented polypropylene (heat sealing layer) having a thickness of 70 μm (RXC-18; Tocelo Co., Ltd.) was laminated on this oriented nylon to prepare a packaging film as shown in FIG. 3.

Figure 3:
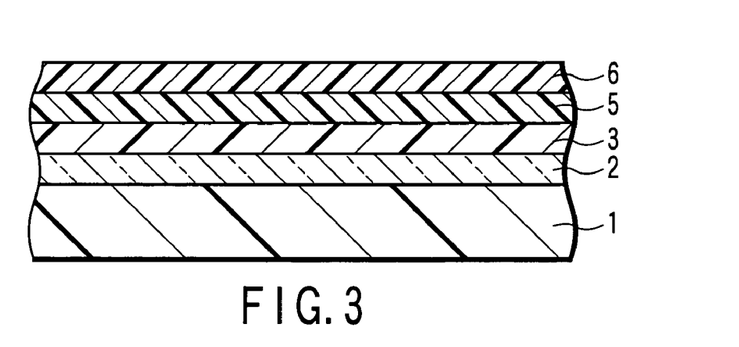
FIG. 3 is a cross-sectional view illustrating one example of a packaging material prepared by making use of a gas barrier laminate film according to the present invention.

As shown in FIG. 3, the packaging film thus obtained was constituted by an aluminum oxide vapor deposition layer 2, a gas barrier covering layer 3, an oriented nylon layer 5 having an underlying adhesive layer (not shown), and a heat seal layer 6 having an underlying adhesive layer (not shown), which were laminated, in the mentioned order, on the surface of substrate 1.

By making use of this packaging film thus prepared, a pouch having sealed four sides was prepared. Then, the pouch was filled with water as a content. Thereafter, the pouch was subjected to retort sterilization treatment for 30 minutes at a temperature of 121° C. to measure oxygen transmittance before and after the retort treatment under an atmosphere of 30° C. in temperature and 70% in relative humidity by making use of an oxygen transmittance-measuring apparatus (OXT-RAN-2/20; Modern Control Co., Ltd.). Further, this laminated packaging film was cut to obtain samples each having a width of 15 mm. Then, by making use of Tensiron (tension tester; Orientech Co., Ltd.), the 90° peeling was performed and the peeling strength of these samples before and after the retort sterilization treatment was determined at a peeling speed of 300 mm/min and under an atmosphere of 23° C. in temperature and 65% in relative humidity. Further, the sealed portion of the pouch was bent 180 degrees after the retort sterilization treatment to visually observe the state of delamination between the sealant layer and the vapor deposition layer 2.

Criterion of visual assessment:
○: Delamination was not recognized
×: Delamination was partially generated
The results are shown in Table 1.

EXAMPLE 9

A packaging film was prepared in the same manner as in the case of Example 1 except that, instead of forming the aluminum oxide vapor deposition layer, a silicon oxide vapor deposition layer having a thickness of 400 angstroms was formed by using a silicon oxide evaporation source, and by thermally evaporating the silicon oxide by means of electron beam heating system while introducing oxygen gas so as to adjust the composition ratio of Si:O to 1:1.6, and that the mixing ratio of components, i.e. A/B/C, of the coating liquid for the gas barrier covering layer was set to 70/20/10.

In the same manner as described above, the packaging film thus obtained was then tested to measure the oxygen transmittance and the peeling strength before and after the retort sterilization treatment, and further, the packaging film was subjected to a 180-degree bending test.

The results obtained are shown in the following Table 1.

TABLE 1

| Samples | Film composition Al | O | Mixing ratio A | B | C | D | E | F | Before retort treatment Transmittance | Laminate strength | After retort treatment Transmittance | Laminate strength | External appearance |
|---|---|---|---|---|---|---|---|---|---|---|---|---|---|
| Ex. 1 | 1 | 1.8 | 70 | 20 | 10 | — | — | — | 0.3 | 6.4 | 0.8 | 5.2 | ○ |
| Ex. 2 | 1 | 1.8 | 70 | 20 | — | 10 | — | — | 0.3 | 6.2 | 0.7 | 5.0 | ○ |
| Ex. 3 | 1 | 1.8 | 70 | 20 | — | — | — | 10 | 0.3 | 6.2 | 1.2 | 4.8 | ○ |
| Ex. 4 | 1 | 1.8 | 20 | 20 | 60 | — | — | — | 0.3 | 6.5 | 1.8 | 3.2 | ○ |
| Ex. 5 | 1 | 1.8 | 90 | 5 | 5 | — | — | — | 0.3 | 4.5 | 1.7 | 4.2 | ○ |
| Ex. 6 | 1 | 1.0 | 70 | 20 | 10 | — | — | — | 0.3 | 4.0 | 0.7 | 3.1 | ○ |
| Ex. 7 | 1 | 2.2 | 70 | 20 | 10 | — | — | — | 1.4 | 6.8 | 2.5 | 6.2 | ○ |
| Ex. 8 | 1 | 1.8 | 100 | 20 | — | — | 10 | — | 0.3 | 6.5 | 1.5 | 4.8 | ○ |
| Ex. 9 | 1 | 1.6 | 70 | 20 | 10 | — | — | — | 0.3 | 5.8 | 1.0 | 4.2 | ○ |
| Comp. Ex. 1 | 1 | 1.8 | 70 | 30 | — | — | — | — | 0.3 | 6.2 | 5.8 | 1.2 | x |

Mixing ratio: Weight ratio of solid matters
Transmittance: Oxygen transmittance (cm$^3$/m$^2$ day·atm)
Laminate strength: Laminate strength N/15 mm width It will be recognized from Table 1 that the packaging films obtained from the aforementioned Examples 1-9 and Comparative Example 1 were all satisfactory in oxygen barrier property and adhesion before the retort sterilization treatment. However, after the retort sterilization treatment, the packaging film of Comparative Example 1 was found poor in oxygen barrier property due to low water resistance of the gas barrier covering layer 3. Further, the packaging film of Comparative Example 1 was low in adhesion and the external appearance thereof was also poor since partial peeling of the packaging film was observed. Whereas, with respect to the samples of Examples 1-9, they were found excellent in oxygen barrier property and adhesion, and the external appearance thereof was also excellent.

EXAMPLE 10

A biaxially oriented PET (P60; Toray Co., Ltd.) having a thickness of 12 μm and a corona-treat surface was employed as a substrate and aluminum was thermally deposited on the corona-treat surface by means of electron beam heating system using an aluminum evaporation source. In this case, the evaporation of aluminum was adjusted while introducing oxygen gas so as to obtain a prescribed film composition of: Al:O=1:1.8, thereby forming an aluminum oxide vapor deposition layer having a thickness of 150 angstroms.

The same kind of coating liquid for the gas barrier covering layer as employed in Example 1 was coated, by means of gravure coating method, on the upper surface of the aforementioned deposition layer and dried to create a gas barrier covering layer having a dried film thickness of 0.3 μm, thereby obtaining a gas barrier laminate film of Example 10 as shown in FIG. 1.

Further, the same kind of coating liquid for the gas barrier covering layer which was prepared according to the same method as that of Comparative Example 1 was coated, by means of gravure coating method, on the surface of the vapor deposition layer and dried to create a gas barrier covering layer having a dried film thickness of 0.3 μm, thereby obtaining a gas barrier laminate film of Comparative Example 2 having the same structure as shown in FIG. 1.

In the same manner as in Example 1, an oriented nylon layer and a sealant layer were formed on the surface of the gas barrier covering layer of each of the gas barrier laminate films of Example 10 and Comparative Example 2, thereby manufacturing packaging films each having the same structure as shown in FIG. 3.

The peeling strength of each of the packaging films of Example 10 and Comparative Example 2 prepared as described above was measured. These laminated packaging films were respectively cut to obtain samples each having a width of 15 mm. Then, in the same manner as described in Example 1, the 90° peeling test was performed. Further, while dropping a little quantity of city water onto a peeling interface between the vapor deposition layer 2 and the sealant layer, the peeling strength was measured in the same manner as described above, the results being illustrated in Table 2.

The 90° peeling test was also performed in the same manner as described above on the packaging film having the same structure as that of Example 8. The results obtained are also shown in the following Table 2.

TABLE 2

| Samples | Laminate strength Water was not dropped | Water was dropped |
|---|---|---|
| Ex. 8 | 6.5 | 3.5 |
| Ex. 10 | 6.4 | 4.5 |
| Comp. Ex. 1 | 1.2 | 0.2 |

EXAMPLES 11-15

A PET film having a thickness of 12 μm and a corona-treat surface was employed as a substrate and the following coating liquid (G) for a primer layer was coated, by means of gravure coater, on the corona-treated surface so as to form a primer layer having a thickness of 0.1 μm.

(G): A solution prepared by mixing acrylic polyol and triidyl isocyanate in such a way that the OH group of the acrylic polyol became equivalent to NCO group to obtain a mixture which was diluted with ethyl acetate so as to include 5 wt % of solid matter in total and then, 5 wt % (based on the total solid matters) of β-(3,4-epoxycyclohexyl)trimethoxy silane was added to the mixture, thus obtaining the solution.

In the same manner as in Example 1, an aluminum oxide vapor deposition layer was formed on the primer layer. Further, the aforementioned coating solutions (A)-(E) were mixed according to the following compositions to prepare coating solutions. Then, by making use of a bar coater, these coating solutions were respectively coated on the upper surface of the aluminum oxide vapor deposition layer and dried for one minute at a temperature of 120° C. by means of drying apparatus to form a gas barrier covering layer having a thickness of about 0.3 μm, thereby obtaining a gas barrier laminate film having the same construction as shown in FIG. 2.

The mixing ratio of the components in a coating liquid for the gas barrier covering layer:

The mixing ratio is all based on weight ratio of solid matter.

Example 11 - - - A/B/C=70/20/10
Example 12 - - - A/B/D=70/20/10
Example 13 - - - A/B/E=70/20/10
Example 14 - - - A/B/C=20/20/60
Example 15 - - - A/B/C=90/5/5
Comparative Example 3 - - - A/B=70/30

By making use of an oil pen (black), a square of 3 cm×3 cm was drawn on the surface of the gas barrier covering layer of the gas barrier laminate film and the interior of the square was entirely painted. Then, the surface of the covering layer 3 was turned upward and the four sides of the laminate was fixed by means of a mount, and then the gas barrier laminate film was subjected to a retort treatment for 30 minutes at a temperature of 121° C. After finishing this retort treatment, the state of the oil pen (black) on the surface of the gas barrier covering layer 3 was visually observed to evaluate the water resistance of the gas barrier covering layer. The results thus obtained are shown in the following Table 3.

Criterion of visual assessment:

1: The surface of the gas barrier covering layer was dissolved so that there was no residual ink on the surface of the gas barrier covering layer 2: Part of the ink was permitted to remain on the surface of the gas barrier covering layer 3: The ink was permitted to entirely remain on the surface of the gas barrier covering layer Further, by making use of the gas barrier laminate film thus obtained, a packaging film was manufactured in the same manner as in Example 1.

Figure 4:
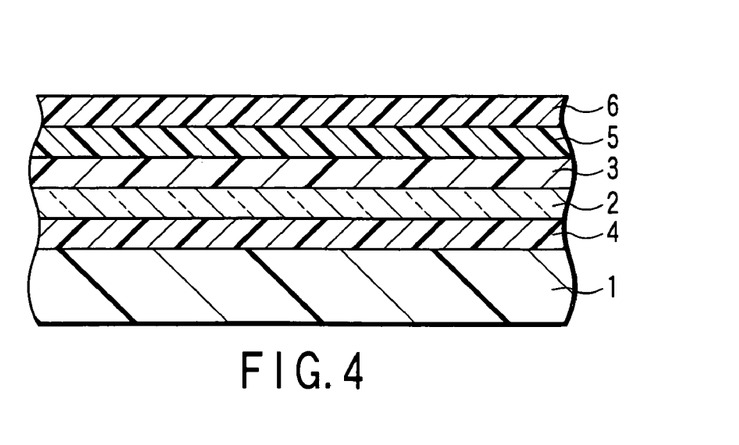
FIG. 4 is a cross-sectional view illustrating another example of a packaging material prepared by making use of a gas barrier laminate film according to the present invention.

The packaging film thus obtained is shown in FIG. 4.

As shown in FIG. 4, the packaging film thus obtained was constituted by a primer layer 4, an aluminum oxide vapor deposition layer 2, a gas barrier covering layer 3, an oriented nylon layer 5 having an underlying adhesive layer (not shown), and a heat seal layer 6 having an underlying adhesive layer (not shown), which were laminated, in the mentioned order, on the surface of substrate 1.

By making use of the packaging film thus obtained, a pouch was prepared in the same manner as in Example 1. Further, in the same manner as in Example 1, the oxygen transmittance before and after the retort treatment was determined and at the same time, the 90° peeling test was also performed to determine the peeling strength.

The results obtained are shown in the following Table 3.

The measurement of oxygen transmittance before and after the retort treatment and 90° peeling test was also performed in the same manner as described above on the packaging film having the same structure as that of Example 8. The results obtained are also shown in the following Table 3.

TABLE 3

| Samples | Mixing ratio | | | | | | Before retort treatment $O_2$ transmittance | After retort treatment | | |
|---|---|---|---|---|---|---|---|---|---|---|
| | A | B | C | D | E | F | | $O_2$ transmittance | Laminate strength | Water resistance |
| Ex. 8 | 100 | 20 | — | — | 10 | — | 0.3 | 0.6 | 6.5 | 3 |
| Ex. 11 | 70 | 20 | 10 | — | — | — | 0.3 | 0.6 | 6.6 | 3 |
| Ex. 12 | 70 | 20 | — | 10 | — | — | 0.3 | 0.5 | 6.4 | 3 |
| Ex. 13 | 70 | 20 | — | — | 10 | — | 0.3 | 1.0 | 7.2 | 3 |
| Ex. 14 | 20 | 20 | 60 | — | — | — | 0.3 | 2.0 | 4.8 | 3 |
| Ex. 15 | 90 | 5 | 5 | — | — | — | 0.3 | 1.7 | 5.2 | 2 |
| Comp. Ex. 3 | 70 | 30 | — | — | — | — | 0.3 | 3.1 | 6.8 | 1 |

It will be recognized from Table 3 that as compared with the gas barrier laminate films obtained in Examples 8, 11-15, the gas barrier laminate film obtained in Comparative Example 3 was easily dissolved in the retort treatment since the gas barrier covering layer was formed of a single film. Whereas, the gas barrier covering layers of the gas barrier laminate films of Examples 8, 11-15 were found indissoluble in the retort treatment since the gas barrier covering layers were improved in water resistance. Further, while the film of Comparative Example 3 was caused to deteriorate in oxygen transmittance after the retort treatment, the gas barrier laminate films of Examples 8, 11-15 were prevented from generating pores therein, thus indicating excellent gas barrier properties before the retort treatment, and, even after the retort treatment, the excellent gas barrier properties were kept retained without substantially indicating any deterioration. Further, it was found that the laminate strength of these gas barrier laminate films was not caused to deteriorate at all by the retort treatment.

According to the present invention, it is possible to provide a packaging material which is excellent in gas barrier properties, is capable of retaining excellent gas barrier properties even after the boiling/retort sterilization treatments, is capable of manufacturing a gas barrier film excellent in adhesion, and is capable of enabling to perform post workings such as printing, dry laminating, melt extrusion laminating and hot press laminating, thereby making the packaging material practically useful in a wide field of applications such as in the packaging of foodstuffs, and retort foodstuffs, as well as non-foodstuffs such as medicine and electronic articles.

What is claimed is:

1. A gas barrier laminate film comprising: a resin substrate;
a gas barrier vapor deposition layer formed on the resin substrate and mainly containing an inorganic compound; and
a gas barrier covering layer formed on the gas barrier vapor deposition layer;
wherein the gas barrier covering layer is formed through the coating, and drying of a coating liquid which comprises:
one of materials selected from a silicon compound represented by a general formula of $Si(OR^1)_4$ ... (1) and the hydrolyzates thereof;
one of materials selected from a silicon compound represented by a general formula of $(R^2Si(OR^3)_3)_n$ ... (2) and the hydrolyzates thereof (wherein $R^1$ and $R^3$ are individually $CH_3$, $C_2H_5$ or $C_2H_4OCH_3$; and $R^2$ is an organic functional group consisting of isocyanate); and
a water-soluble polymer having hydroxyl group.

2. The gas barrier laminate film according to claim 1, wherein the inorganic compound is transparent.

3. The gas barrier laminate film according to claim 2, wherein the inorganic compound is aluminum oxide.

4. The gas barrier laminate film according to claim 3, wherein the aluminum oxide is selected from those where the ratio between aluminum and oxygen is confined within the range of: Al:O=1:1.5-1:2.0.

5. The gas barrier laminate film according to claim 1, wherein the hydrolyzable group ($R^1$) of the general formula $Si(OR^1)_4$ ... (1) is $C_2H_5$.

6. The gas barrier laminate film according to claim 1, wherein when $Si(OR^1)_4$ is calculated as $SiO_2$ and when $R^2Si(OR^3)_3$ is calculated as $R^2Si(OH)_3$, the solid matter of $R^2Si(OH)_3$ is confined within the range of 1-50 wt % based on the total weight of solid matters.

7. The gas barrier laminate film according to claim 1, wherein the general formula $((R^2Si(OR^3)_3)_n$ ... (2) is a trimer 1,3,5-tris(3-trialkoxysilylalkyl)isocyanurate to be represented by the general formula: $(OCN-R^4Si(OR^3)_3)_3$ (wherein $R^4$ is $(CH_2)_n$, n is 1 or more).

8. The gas barrier laminate film according to claim 1, wherein when $Si(OR^1)_4$ is calculated as $SiO_2$ and $R^2Si(OR^3)_3$ is calculated as $R^2Si(OH)_3$, the mixing ratio, based on weight, of solid matters, i.e. $SiO_2/(R^2Si(OH)_3$+water-soluble polymer), is confined within the range of 100/100 to 100/30.

9. The gas barrier laminate film according to claim 1, wherein a primer layer comprising acrylic polyol, isocyanate and a silane coupling agent is interposed between the substrate and the inorganic vapor deposition layer.

10. The gas barrier laminate film according to claim 1, wherein a heat seal layer is further disposed on the gas barrier covering layer.

* * * * *